US005411784A

United States Patent [19]

Brewster

[11] Patent Number: 5,411,784

[45] Date of Patent: May 2, 1995

[54] SELF-LAMINATING POLYESTER DATA-TAG

[75] Inventor: Blair M. Brewster, Brooklyn Heights, N.Y.

[73] Assignee: Permar Systems, Inc., Wolcott, N.Y.

[21] Appl. No.: 41,402

[22] Filed: Mar. 31, 1993

[51] Int. Cl.[6] .......... B32B 3/10

[52] U.S. Cl. .......... 428/131; 428/35.7; 428/41; 428/52; 428/68; 428/137; 428/480; 428/688; 40/584; 40/594

[58] Field of Search .......... 428/688, 68, 52, 41, 428/35.7, 335, 354, 131, 133, 137, 480; 283/67, 109; 281/29; 40/665, 49, 334, 594, 584, 607, 617, 642, 661, 662

[56] References Cited

U.S. PATENT DOCUMENTS

| | | | |
|---|---|---|---|
| 3,947,983 | 4/1976 | Brunette | 40/27 |
| 4,159,586 | 7/1979 | Blum | 40/299 |
| 4,202,923 | 5/1980 | Thoese | 428/144 |
| 4,407,524 | 10/1983 | Trautlein | 462/18 |
| 4,786,350 | 11/1988 | Nesbutt et al. | 156/244.24 |
| 4,901,462 | 2/1990 | Wrigley | 40/665 |
| 4,907,359 | 3/1990 | Berman | 40/299 |
| 4,951,970 | 8/1990 | Burt | 283/67 |
| 5,090,732 | 2/1992 | Kuhns et al. | 281/29 |
| 5,100,181 | 3/1992 | Nathans et al. | 283/109 |
| 5,108,836 | 4/1992 | Ocampo et al. | 428/335 |

*Primary Examiner*—Patrick J. Ryan
*Assistant Examiner*—William A. Krynski
*Attorney, Agent, or Firm*—Cumpston & Shaw

[57] ABSTRACT

Self-laminating data-tags having a polyester substrate coated with a pencil receptive writing surface and a non-conducting reinforcer are obtained. Provisions are made for protecting the writing surface, replicating the data and removing the data-tag. Such data-tags are particularly useful as warning tags for utility equipment and in severe environmental conditions.

26 Claims, 5 Drawing Sheets

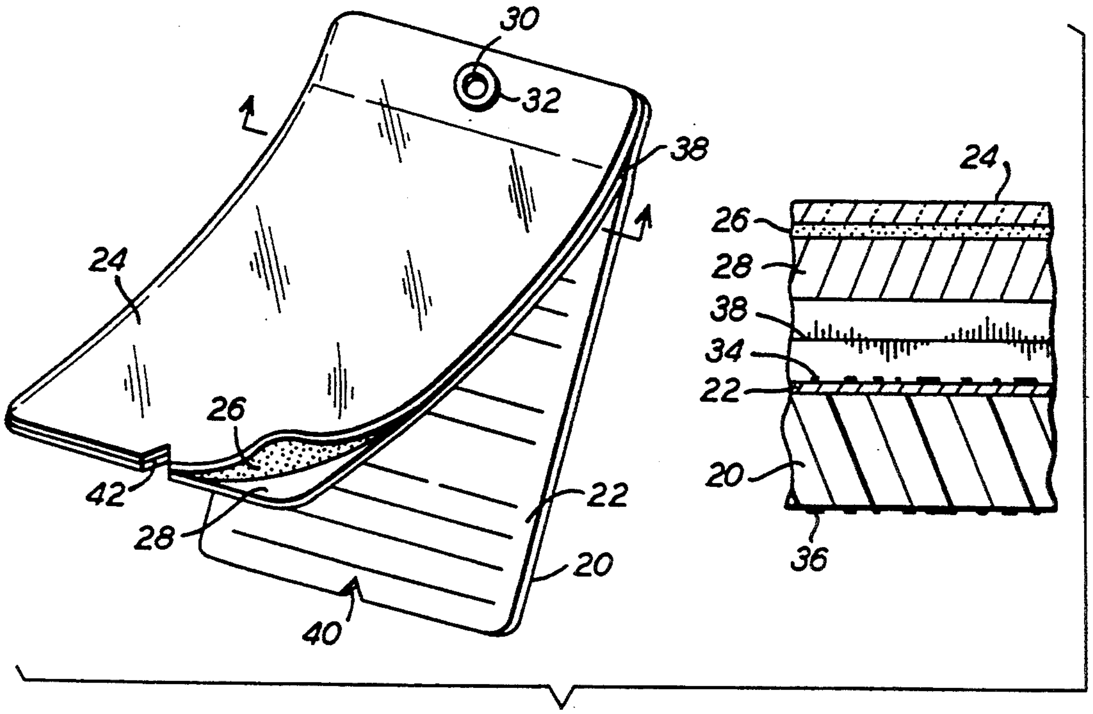
FIG. 1
FIG. 2
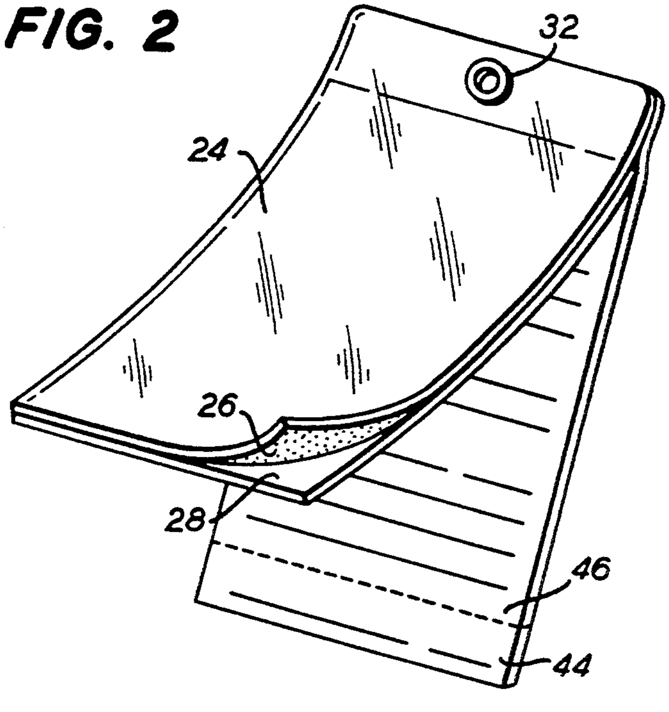

SELF-LAMINATING POLYESTER DATA-TAG

FIELD OF THE INVENTION

This invention relates generally to data-tags or labels for the utility industry, and more particularly to a self-laminating polyester data-tag having a pencil receptive writing surface and a reinforcing grommet for use in severe environments.

BACKGROUND OF THE INVENTION

The utility industry uses warning data-tags or labels in a variety of situations to instruct personnel that a potentially dangerous situation exists. For example, when a piece of equipment or a transmission line is disabled so that it can be serviced, the service person attaches a lock or warning tag to the switch while he is servicing the line or equipment, often at a remote location not visible from the switch. The workers will not accidently re-energize the equipment while the lock or tag is present.

The use of such tags is mandated not only by common sense, but in some instances government regulations require their use.

A suitable data-tag should be constructed from materials which are resistant to severe environmental conditions and non-hazardous. The design of the tag should be such that the instruction posted on it is protected from the environment, clearly visible and readable under adverse lighting conditions, and tamper-resistant, over an extended period of time. Eventually the tag may have to be removed or destroyed because the need for a warning is eliminated and a means for so doing should be provided. In many applications provisions for duplicating the information on the tag should be incorporated.

The most common type of data-tag presently being used is a vinyl tag. Vinyl has the advantages of being readily available to tag manufacturers and relatively inexpensive. However, we have found that vinyl is not strong enough in some situations. For example, when the tag is applied to switches on utility transmission lines in coastal or other high wind areas, the tag may tip and blow off the line. This type of failure may have fatal consequences. Vinyl also becomes brittle when exposed to ultra-violet rays, such as sunlight. Adding UV absorbers to vinyl is a possible solution, but vinyl with such absorbers is less commonly available and more expensive.

We have found that polyester is a better material for manufacturing warning tags. Polyester has a much higher tear resistance than vinyl. Polyester may discolor after long term exposure to the sun, but does not become as brittle as vinyl, and therefore provides a much more secure tag. Polyester has a much higher melting point than vinyl. Therefore polyester can be used in higher temperature situations where vinyl would melt or deform if it contacted or was adjacent to a hot surface. The tensile strength of polyester is as much as two to four times greater than vinyl of the same thickness. The dielectric strength of polyester is one and one-half to two times that of vinyl. While vinyl may melt or deform at temperatures as low as 150° F. (60° C.), polyester is usable at temperatures of 225° to 300° F. (107° to 149° C.) or higher.

Known warning tags use reinforcing grommets or eyelets in their mounting holes. Some inexpensive paper tags use reinforced paper, but grommets are far stronger and are required in environmentally severe installations. Most eyelets or grommets are made from brass, although some stainless steel grommets are used. The metal has to be ductile enough to bend easily in an eyeletting tool. Metal grommets have the disadvantage that when made of less expensive materials they can rust and even more importantly, they are conductive. When warning tags are used on high voltage transmission lines, intense electric fields are often present that may cause arcing or flashing when metal grommets are used. A non-conducting reinforcer which will increase the pull strength at the mounting hole is desirable. Plastic snap-grommets are known for use with large banners, but most are too thick to be used in utility warning tags because they could catch on equipment, are readily pried apart, hard to package, and expensive. We have developed a nylon grommet that is stronger, much thinner and harder to disassemble. The nylon grommet also can be provided with ultrasonic focusing projections for allowing the grommet parts to be welded together.

Conventionally, utility data-tags are formed from vinyl sheet about 10 mils (0.25 mm.) thick. We have found that by using polyester and increasing the base film thickness to 12–15 mils (0.3–0.375 mm.), the tags are even stronger than 10 mils (0.25 mm.) polyester. However, the tags must be removable and utility personnel prefer tags that can be removed without special tools. Since polyester is so much tougher than vinyl, it is hard to tear. We provide a stress concentrating region on the tag for starting a tear, so that the tag can be easily ripped in half. The region can be just a line cut into the tag or a shaped notch, for example V-shaped, which is more visible to the user and directs the User to the proper point at which to tear. Other methods for initiating a tear can be used, for example, slitting or scoring the surface, or providing a thinner region at the edge of the substrate.

In many applications, it is necessary to label the tag at the time it is applied. We provide a titanium dioxide coating on our polyester substrates to give the tag an exceptional pencil receptivity. By using this coating, we provide a tag that shows pencil markings in a blacker more durable form than in prior tags. Similar coatings have been used in other applications, such as credit cards, but not, as far as we are aware, on polyester utility data-tags.

The data-tag of this invention is particularly useful when embodied in a self-laminating form with or without an integral carbon paper or pressure activated carbonless record sheet. The self-laminating tag has a layer or flap of clear, preferably UV blocking film, such as polyvinyl fluoride film attached to the polyester substrate at one end. The film is covered with a layer of pressure sensitive adhesive and the unattached end is protected by a removable protective sheet. The pencil receptive titanium dioxide writing surface is formed on the front of the polyester substrate under the clear flap and normally has a printed form thereon. In use, the surface of the tag has a printed form thereon and the tag can be marked with the date on which it is installed, a signature, or the like, the protective layer pulled from the clear flap, and the adhesive backed portion of the flap pressed onto the substrate to form a durable, laminated assembly. In certain applications we also provide a carbon or pressure activated carbonless record sheet on the tag that the user can mark either separately or together with the substrate and remove from the tag to keep a record of the date and time for installation, for example. For applications in which the record sheet is behind the polyester backing the thickness of the backing is preferably from 5 to 10 mils (0.125 to 0.25 mm) thick to allow increased pressure on the record sheet. The thinner polyester base is still strong enough for all but the most severe environmental conditions.

We have found it desirable in some applications to use fluorescent and/or phosphorescent pigments for the indicia of the printed form on the polyester substrates of our tags. These pigments make the legends on the tags much easier to read in adverse conditions such as fog, rain, darkness or the like.

We provide instructions and/or illustrations on how to use the tag on the removable protective sheet that is attached to the clear flap which are visible from the front of the tag. These instructions and illustrations are therefore available to the user at the time the tag is installed, and some users find them very helpful. The instructions can be included at essentially no cost, since they are applied to a necessary component of the tag.

We provide a number of other features, some of which have been used by us and by others in the past, but never in combination with the inventive features of our new tag. For example, in some embodiments of our invention we provide a removable polyester or paper portion attached to the tag by a line of weakness, preferably a line of perforations.

While most of our tags are attached by means of a fastener threaded through the mounting hole, we provide a version of the tag with an adhesive backing that can be adhered to a flat surface.

Most tags presently in use have square or chambered corners. We have discovered that rounded corners resist delamination of the clear cover sheet more effectively, and therefore we use rounded corners on our tags.

U.S. Pat. No. 4,407,524 (Trautlein) discloses a durable data-tag having a durable backing member, an adhesive clear cover member and a plurality of identical layered, record form sheets wherein the layered form sheets are attached to the backing member at the end opposite to that which the clear cover member is attached. There is no disclosure of a polyester backing member or of a non-conducting grommet.

SUMMARY OF THE INVENTION

Briefly stated, and in accordance with a presently preferred embodiment of our invention, a self-laminating data-tag for attaching to a piece of equipment to provide instructions to users, such as a warning sign comprises a polyester substrate at least 5 mils (0.125 mm) thick having a mounting hole for receiving a fastener and a non-conducting reinforcer mounted in said mounting hole for preventing substrate, damage by the fastener. A preferred embodiment of this invention utilizes a plastic grommet as the reinforcer.

In accordance with another aspect of the invention, the tag includes a pencil receptive coating on a portion of the substrate for permitting information to be recorded on the tag.

In accordance with another aspect of this invention, the tag includes a stress concentrating region for assisting a user to start a tear in the substrate for removing the tag.

In a preferred embodiment of the invention, the stress concentrating region is a V-shaped notch.

In accordance with another aspect of this invention, the tag includes a sheet of clear material having an adhesive layer and a removable protective sheet covering the adhesive layer.

In a preferred aspect of the invention, the removable protective sheet includes instructions for using the tag.

In accordance with another aspect of this invention, a surface of the polyester substrate has a printed form thereon.

In accordance with another aspect of the invention the polyester substrate uses fluorescent and/or phosphorescent pigments for a printed form thereon.

In accordance with another aspect of the invention, the tag includes a removable form attached to the substrate by a line of weakness, preferably a line of perforations.

In accordance with another aspect of this invention, the tag includes an adhesive layer on the substrate for adhering the substrate to a receiving surface, and preferably a removable protective film covering the adhesive attaching layer.

In accordance with another aspect of the invention, the substrate and sheet of clear material have matching rounded corners to reduce the tendency of the clear material to delaminate from the substrate.

In accordance with another aspect of the invention, the data-tag is provided with a plurality of mounting holes formed adjacent to the edges of the tag.

While the novel aspects of the invention are set forth with particularity in the appended claims, the invention itself, together with further objects and advantages thereof may be more readily understood by reference to the following detailed description of a presently preferred embodiment of the invention taken in conjunction with the following drawings in which:

BRIEF DESCRIPTION OF THE DRAWINGS

FIG. 1 is a perspective view of a data-tag, partially open, and a cross section view of the layered structure of a first embodiment of the invention having one protective sheet of clear material over a polyester base.

FIG. 2 is a perspective view of a data-tag, partially open, and a cross section view of the layered structure of a second embodiment of the invention in which the polyester base is only partially covered by the clear sheet of material.

DETAILED DESCRIPTION OF THE INVENTION

Figure 3:
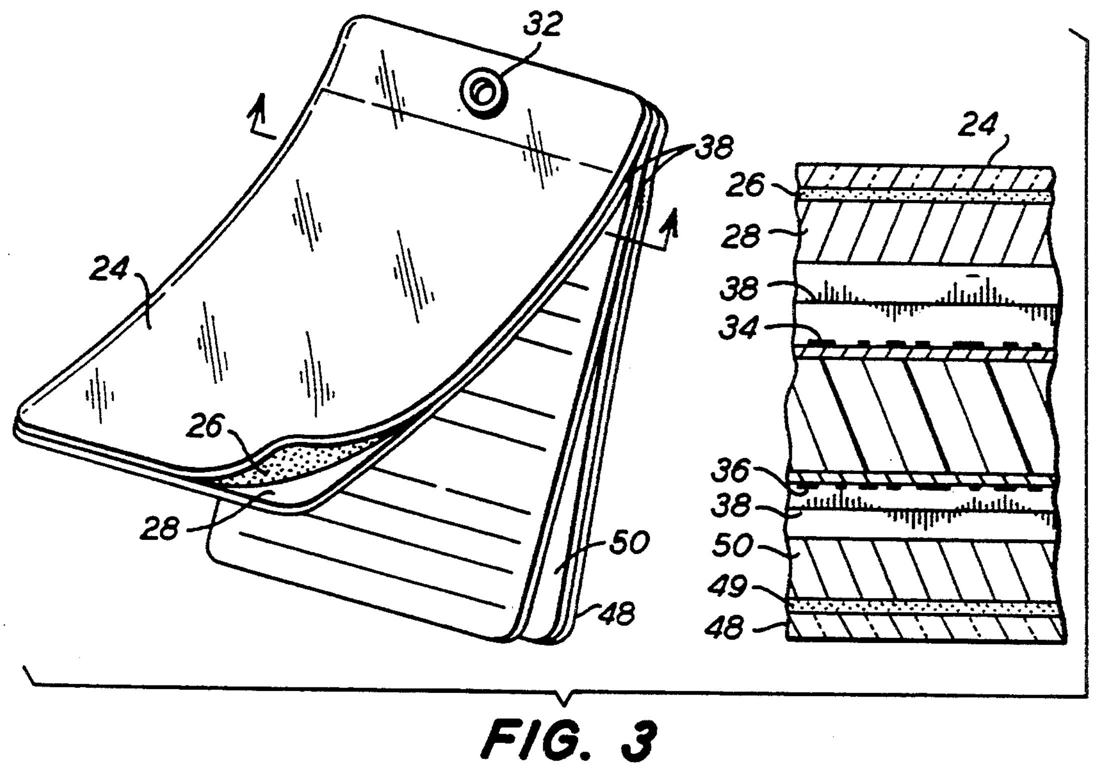
FIG. 3 is a perspective view of a data-tag, partially open, and a cross section view of the layered structure of a third embodiment of the invention in which the data-tag is coated on both sides and provided with two sheets of clear material.

In a first embodiment of the invention as shown in FIG. 1, a self-laminating data-tag for providing instruction such as a warning against using a piece of equipment has a polyester substrate which serves as a backing sheet 20. This substrate is made from a polyester plastic which is resistant to tearing and cracking and is stable to heat and chemicals.

Polyesters which are suitable include those derived by polymerization of saturated or unsaturated dicarboxylic acids with polyols. Dicarboxylic acids which may been (mentioned include phthalic acid, isophthalic acid and maleic acid, for example. Polyols which may be mentioned include ethylene glycol, propylene glycol, neopentyl glycol, bisphenol A and the like. Such polymers may further comprise styrene or polyolefins such as polyethylene or polypropylene as modifiers. Such polyesters are commercially available, for example, Mylar A from E. I. DuPont de Nemours and Co. or Melinex 339 from ICI Ltd. Recycled polyester materials may also be fabricated for data-tags. The polyester is preferably stable up to temperatures of about 300° F. (149° C.).

The polyester substrate is at least 5 mils (0.125 mm) thick and preferably 10 to 15 mils (0.25 to 0.375 mm) thick to provide sufficient strength for use in a stressful environment, for example, on utility equipment such as transmission lines. A thickness of from 12 to 15 mils (0.3 to 0.375 mm) provides even greater strength and is preferred for severe outdoor conditions. The backing sheet 20 may be cut to any shape or size but is most conveniently of rectangular shape with square or chamfered corners. In a preferred embodiment the corners are rounded to resist delamination.

The surface of the polyester substrate is receptive for printing or marking with a writing instrument such as a pen, pencil or permanent marker. In a preferred embodiment the writing surface is coated with a thin layer of titanium dioxide 22 which has excellent pencil receptivity and shows pencil markings in a black and durable form. The titanium dioxide coating is from about 0.3 to 1 mil (0.0075 to 0.025 mm) thick, preferably from 0.3 to 0.5 mil (0.0075 to 0.0125 mm).

A sheet of clear material 24 having an inner surface coated with a pressure sensitive adhesive layer 26 is adhesively attached to the polyester substrate at one end and the remaining inner surface of the sheet is covered with a removable protective liner. Removal of the liner and pressing the sheet of clear material onto the surface of the substrate 20 forms a laminate and protects the printing and writing from the environment.

The sheet of clear material 24 is a plastic sheet or film such as a vinyl or a polyester film. The film can have a shiny gloss finish or an anti-glare matte finish. In a preferred embodiment the plastic is a polyvinyl fluoride such as Tedlar (sold by DuPont) which has superior ultraviolet blocking properties and thus prevents yellowing of the clear material and the underlying polyester substrate. The sheet of clear material is from 1.5 to 5 mils (0.0375 to 0.125 mm) thick, preferably from 1.5 to 2 mils (0.0375 to 0.05 mm) thick.

The adhesive layer 26 is from 1 to 1.5 mils (0.025 to 0.0375 mm) thick, preferably about 1.2 mils (0.03 mm) and is chosen from any commercially available pressure sensitive adhesive suitable for bonding the aforementioned plastics to the polyester substrate, for example, an acrylic or rubber adhesive.

The protective liner 28 is made of a material which is stiff enough so that it is readily peeled from the adhesive coated sheet. A suitable liner is a paper liner of about 6 mils (0.15 mm) thickness which is provided with a silicone release coating to aid the removal from the clear plastic sheet. Instructions can be printed on the top surface of the liner which are visible through the clear plastic sheet, the adhesive and the silicone release coating.

In the data-tag a mounting hole 30 is provided adjacent to an edge, preferably adjacent to the edge at which the clear protective sheet is attached to the substrate 20. The hole which penetrates all layers of material is provided with a reinforcer for receiving a fastener which is used for attaching the data-tag to a piece of equipment or other object. In another aspect of the invention there can be a plurality of mounting holes formed adjacent to the edges of the tag.

Suitable reinforcers are grommets and eyelets and similar devices. Eyelets are commonly made of a metal such as brass and are conducting whereas grommets are made from metal or preferably a non-conducting material. In a preferred embodiment of the invention a non-conducting plastic grommet is used as the reinforcing means. The grommet 32 has two parts and is made of a non-conducting hard plastic such as nylon, for example Delrin, or polyester, for example Rynite, both from E. I. DuPont de Nemours & Co. or polyethylene, for example from Rexene Corp. which will resist the sawing action of fasteners made from such materials as string, nylon, stainless steel or aluminum wire. In some applications the fastener is in the form of a lock shank. The dimensions of the grommet and other features are described below in the detailed description of FIGS. 9 and 10.

In the usual embodiment of the data-tag the polyester substrate is provided with printed instructions 34 on the coated surface adjacent to the protective sheet. These printed instructions are produced in black or any suitable color and in some applications are produced by using fluorescent and/or phosphorescent pigments to make the instructions on the tags more visible and easier to read in adverse conditions such as fog, rain, darkness or the like. Optionally, the back of the tag may have printing 36 thereon.

Before sealing the tag it may be opened as far as the line 38, at which the non-removable layers of the tag are adhesively bonded. In the cross section view the areas on either side of the line 38 represent the opening between the adjacent layers.

When the user has written instructions or information on the surface of the tag the protective liner is removed- ,and the sheet of clear material is pressed onto the polyester surface to seal in the data. The sealed tag is protected from the environment and is essentially tamper proof, once the adhesive cures.

In a preferred embodiment of the tag the layers of the tag are provided with a stress concentrating region, for example, in the form of coincident V-shaped notches 40 and 42, to allow tearing of the tag and its removal when no longer required. The notches may be incorporated on any edge as required by the application, but are frequently found on an edge opposite a mounting hole so that the tearing action will propagate towards the hole.

Polyester data-tags similar to those of FIG. 1 can be made without a mounting hole. Such data-tags are provided with an adhesive layer and a removable paper liner on the back of the tag. The adhesive can be a clear acrylic adhesive of 1 to 5 mils (0.025 to 0.125 mm) thickness depending on the roughness of the surface to which the tag is to be attached. In fact foam adhesive of about 22 to 32 mils (0.55 to 0.8 mm) thickness can be used for very rough surfaces. Such tags may also be provided with a perforation to permit removal of a portion of the tag for record purposes.

In a second embodiment of the invention, FIG. 2, the data-tag is essentially the same as described for FIG. 1 except that the sheet of clear material does not cover the entire surface of the polyester backing 20. The uncovered portion 44 of the backing 20 is attached to the backing along a line of weakness 46, such as a perforation. The uncovered portion of the tag can be written upon by the user and then removed and kept as a record.

In a third embodiment of the invention, FIG. 3, the data tag of FIG. 1 is coated on both sides with titanium dioxide and provided with a second sheet of clear material 48 attached to the back of the polyester backing and at the same end as the first sheet of clear material is attached. The second sheet of clear material also has a coating of pressure sensitive adhesive 49 and a removable protective liner 50. The clear sheet of material, adhesive and liner are composed of the same materials as described for FIG. 1. Printed surfaces 34 and 36 are provided on both sides of the polyester backing and the user can write on both sides of the tag.

Figure 4:
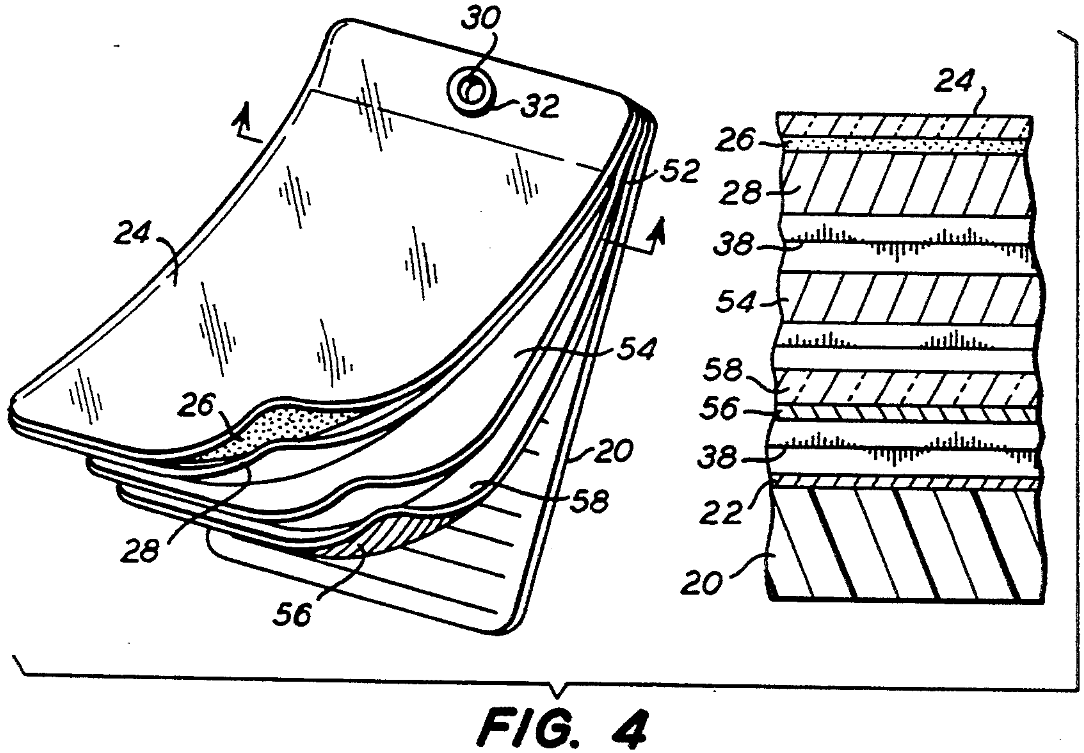
FIG. 4 is a perspective view of a data-tag, partially open and a cross section view of the layered structure of a fourth embodiment of the invention in which a perforated sheet of carbon paper is placed in front of the polyester base.

In a fourth embodiment of the invention. FIG. 4, a data-tag similar to that described for FIG. 1, incorporates a sheet of paper and a sheet of carbon paper between the polyester backing and the sheet of clear material. The incorporated sheets are attached to the front of the backing 20 at the end adjacent the mounting hole 30 and are perforated along the line 52. The paper has a pre-printed form that matches the form on the face of the tag.

The paper 54 may be made of ordinary paper having a plurality of weights and thickness. A thickness of about 3 to 4 mils (0.075 to 0.1 mm) is preferred. The carbon paper 56 consists of a clear base film 58 on top of the carbon paper of about 2.5 to 5 mils (0.0625 to 0.125 mm) thick.

When the user writes on the printed surface of the paper with a pencil or pen the pressure causes transfer of the image to the polyester backing 20 and the image is replicated on the coated surface 22. The paper 54 with the printing and written instruction on its surface is removed for record purposes, the carbon paper is discarded, and then the tag is sealed.

Figure 5:
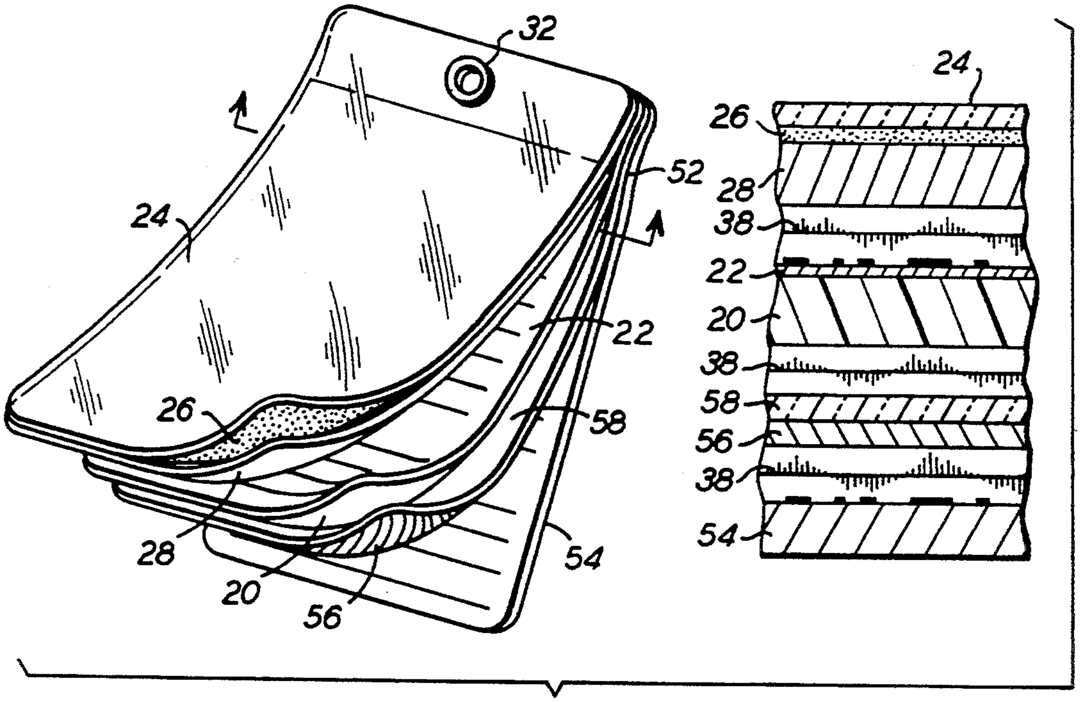
FIG. 5 is a perspective view of a data-tag, partially open and a cross section view of the layered structure of a fifth embodiment of the invention in which a perforated sheet of carbon paper is placed behind the polyester base.

In a fifth embodiment of the invention, FIG. 5, a data-tag similar to that described for FIG. 4 is provided in which the sheet of paper 58 and carbon paper 56 are incorporated behind the polyester backing instead of in front and attached along the perforated line 52.

When the user writes on the coated printed surface 22 of the tag with a pencil or pen the pressure causes transfer of the image to the paper and the image replicated on the paper matches the printing and written instruction of the tag. The paper layer can then be removed for record purposes and the tag is sealed. In a preferred embodiment of the invention, the polyester backing 20 is from 5 to 10 mils (0.125 to 0.25 mm) thick to increase the pressure on the back carbon paper.

Figure 6:
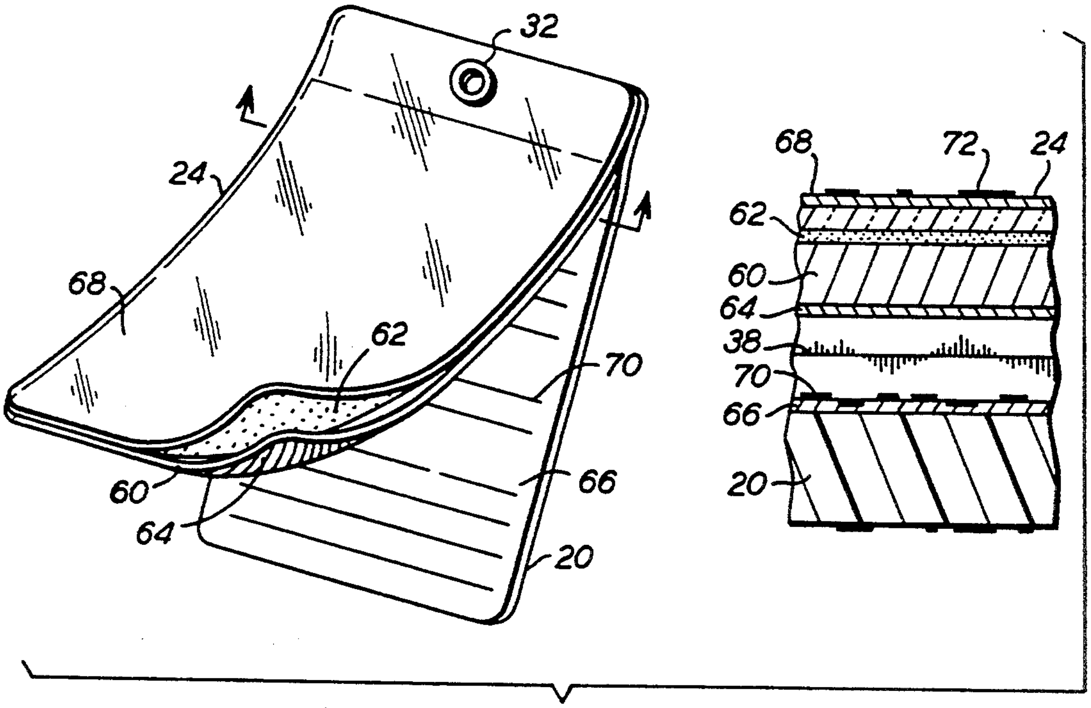
FIG. 6 is a perspective view of a data-tag, partially open and a cross section view of the layered structure of a sixth embodiment of the invention in which the protective paper liner is provided with a carbonless-type pressure coating.

In a sixth embodiment of the invention, FIG. 6, a data-tag similar to that of FIG. 1 is provided in which the protective paper liner 60 is provided with a carbonless-type pressure coating 62 on the top surface and a carbonless-type back coating 64 on the bottom surface. A corresponding carbonless-type front coating 66 is applied to the front of the polyester backing 20. The sheet of clear material 24 is provided with a pencil receptive coating 68, preferably of titanium dioxide. The upper surface of the liner is printed to match the printed surface 70 of the tag 20. It is not necessary to coat the polyester surface with titanium dioxide.

When the user writes on the coated surface 68 of the clear material 24 with a pencil or pen to form an image 72 the pressure causes the image to be replicated on the coated surface 62 of the liner and on the printed surface 70 of the tag 20. The liner can then be removed to serve as a record of the instructions and the tag is then sealed.

There are two different types of carbonless-type coatings, for example, as developed by the National Cash Register Corporation (NCR). The first is a pressure coating which requires only pressure to make an image. In the pressure NCR coating, the chemical reaction occurs because the reactive chemicals are put close together on the same surface. By breaking the chemical capsule/containers, the user creates an image. The second type requires two different matching coatings. By forcing the coating on the back of one sheet (the back coating) onto the coating on the front of the subsequent sheet (the front coating) with the pressure of a pen or pencil, an image is made on the front of the second sheet. The back coating has small capsules of a chemical that, when broken and put in contact with the chemicals of the second sheet, react and make a darker spot.

Figure 7:
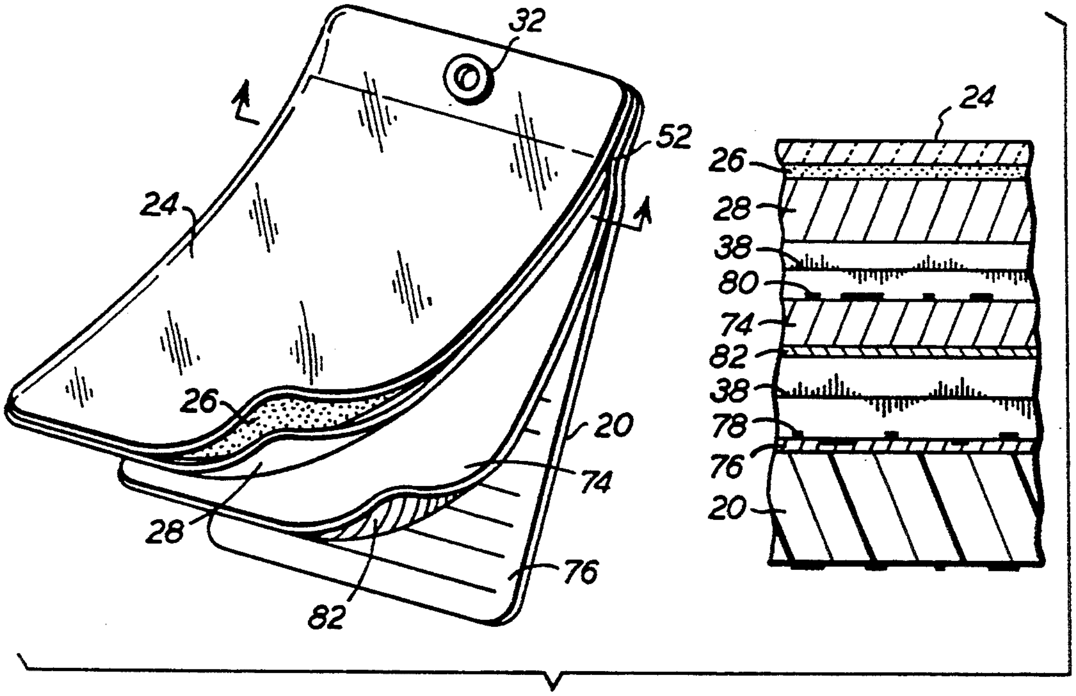
FIG. 7 is a perspective view of a data-tag, partially open and a cross section view of the layered structure of a seventh embodiment of the invention in which a carbonless-type paper is inserted in front of the polyester base.

In a seventh embodiment of the invention, FIG. 7, a data-tag similar to that of FIG. 1 is provided in which a carbonless-type paper 74 is inserted between the polyester backing 20 and the sheet of clear material 24. The polyester backing 20 is provided with a carbonless-type front coating 76 and a printed form 78. The carbonless-type paper 74 is preferably 3 to 4 mils (0.075 to 0.1 mm) thick and has a printed upper surface 80, matching the printed form on the polyester backing, and a lower surface with a carbonless-type back coating 82. The paper 74 is attached at the top end of the tag and perforated along the line 52.

When the user writes on the carbonless-type paper surface with a pencil or pen to form an image on the printed surface the pressure causes the image to be replicated on the coated surface 76 of the polyester backing. The paper can then be removed to serve as a record and the tag is then sealed.

Figure 8:
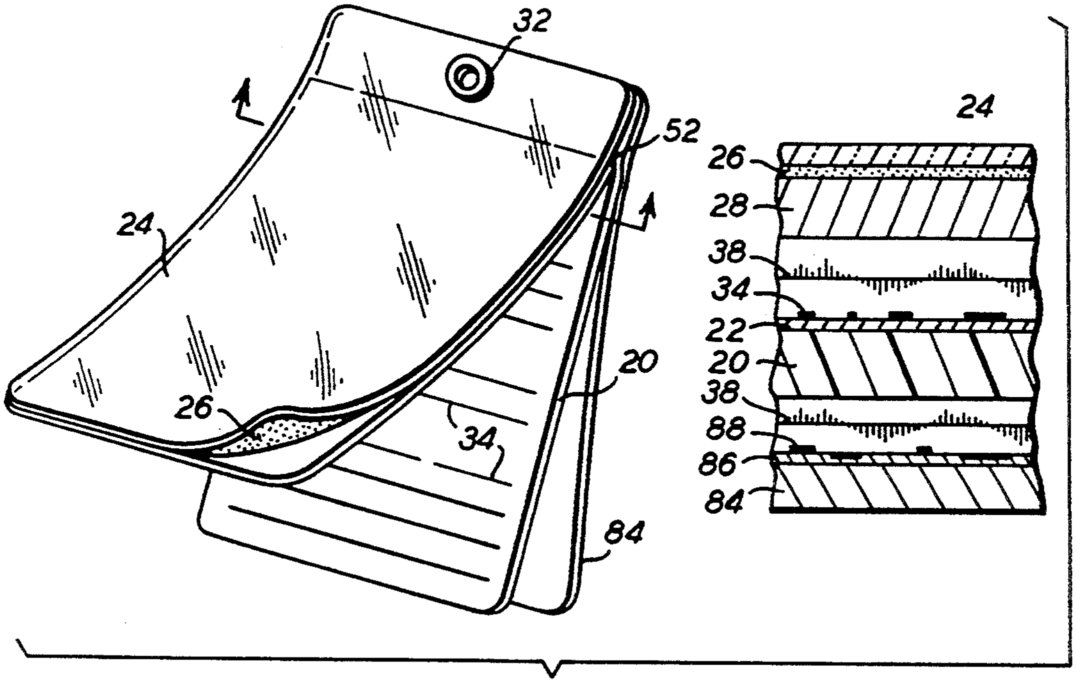
FIG. 8 is a perspective view of a data-tag, partially open and a cross section view of the layered structure of an eighth embodiment of the invention in which a pressure carbonless-type coated paper is placed behind the polyester base.

In an eighth embodiment, FIG. 8, a data-tag similar to that of FIG. 1, is provided in which a pressure carbonless-type coated paper 84 is attached to the back of the polyester tag 20. The polyester tag is provided with a pencil-receptive coating 22 and a printed form 34 on the top surface. The carbonless-type paper is preferably 3 to 4 mils (0.075 to 0.1 mm) thick and has a pressure carbonless-type coating 86 and a printed form on its upper surface. The paper 84 is attached to the top end of the tag and perforated along the line 52.

When the user writes on the coated polyester surface 34 with a pencil or pen to form an image the pressure causes the image to be replicated on the carbonless-type paper surface 86. The paper can then be removed for record purposes and the tag is sealed.

In a preferred embodiment the polyester backing is from 5 to 10 mils (0.125 to 0.25 mm) thick to increase the pressure on the back carbon paper.

The grommet 32 of FIG. 1 is preferably made from non-conducting plastic material such as nylon, polyester, polyethylene, polycarbonate, or acrylonitrile-butadiene-styrene polymer (ABS) and the like. Non-conducting plastic grommets consist of two parts, a male part and a female part. The two parts can be made of the same or different materials and can be of different hardness. When used to reinforce a mounting hole of a data-tag the female part is placed over the hole on one side of the tag and the male part is inserted from the opposite side of the tag through the hole and into the female part so that the tag is sandwiched between the two parts and the two parts are locked together. Several methods are known for locking the parts of the grommet together and any conventional design may be used which is compatible with the data-tag of this invention. The grommet can be colored for greater visibility, for example, red or a fluorescent color.

Figure 9:
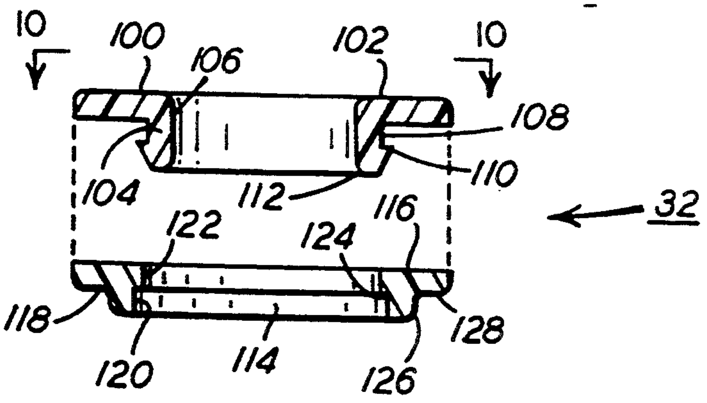
FIG. 9 is a section view of the male and female parts of a non-conducting grommet in accordance with a preferred embodiment of the invention.
Figure 10:
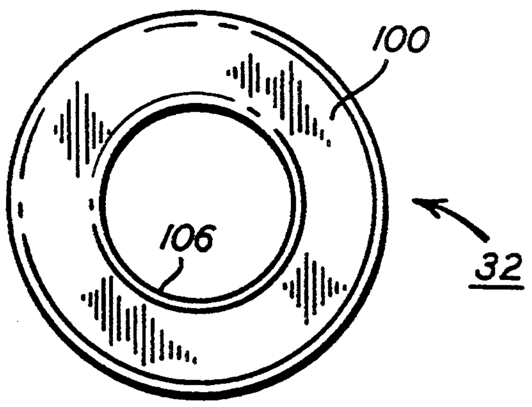
FIG. 10 is a top plan view of the non-conducting grommet in accordance with a preferred embodiment of the invention.

A grommet which is particularly useful with the data-tag of this invention is a snap grommet consisting of the male and female parts described in FIGS. 9 and 10. The grommet is particularly useful for warning data-tags because of its thinness and the secure means of locking the parts together. The overall thickness of the grommet is preferably less than 200 mils (5 mm) although thicker grommets can be used. In another embodiment of the grommet at least one focusing projection is included to allow the pieces to be ultrasonically welded together.

The male part of the snap grommet, FIG. 9, comprises a one-piece molded, plastic, annular locking part 100, having an upper portion 102 in the form of a continuous ring with a wall 104 extending below the inner portion of the ring and at right angles to the ring, said wall having a straight inner side 106 coincident with the inner edge of the ring and an outer side 108 shaped to form a shoulder 110 for locking with a corresponding notch on the female part. The lower end of the wall has a concave surface 112 on the inner side 106, to aid insertion into the female part. The lower surface of the upper ring and the outer side of the wall above the shoulder are at right angles to each other and the space between the surface of the ring and the shoulder is dimensioned to accommodate the thickness of the data-tag and the female part of the grommet.

The female part of the snap grommet, FIG. 9, comprises a one-piece molded, plastic annular base 114, having an upper portion in the form of a continuous ring with a wall 118 extending below the ring and at right angles to the ring, said wall having a straight inner side 120 which is spaced at a distance from the inner side 122 of the ring to form a notch 124 for receiving the shoulder of the male part. The outer side of the wall 126 is radially connected with the lower surface of the ring 128.

In FIG. 10, a top side view of the grommet 32 shows the annular shape of the assembled grommet In which the male part 100 is uppermost.

A polyester data-tag of the invention having the two piece plastic grommet described above, rather than a metal eyelet, has the pull strength at the hole increased by up to about 70%. Pull strength is measured by attaching the top of the tag, by means of the grommet or eyelet, to a pole with a stranded stainless steel rope and gradually increasing weight to the bottom of the tag until the grommet or eyelet pulls out of the tag.

The self-laminating data-tags of the invention featuring a non-conducting grommet facilitate the provision of a securely fastened, durable, non-hazardous and very visible instruction source for a user of industrial equipment under diverse environmental conditions. Provision is made for generating a duplicate record of all or part of the instructions by insertion of a removable data sheet comprised of pressure sensitive image-leaving materials or by providing tear-off portions to the tags. Additionally, provisions are made for protection of the permanent record by adhering a durable, clear sheet of material to the surface of the tag, and for removal of the tag by including a stress concentrating region at an edge of the tag.

What is claimed is:

1. A durable, non-conducting self-laminating data-tag resistant to wet and windy weather conditions and to tampering for securely attaching to a piece of equipment to provide instructions to users comprising:

a tear resistant polyester substrate from about 5 mils (0.125 mm) to about 15 mils (0.375 mm) thick having a mounting hole for receiving a fastener;

a non-conducting, strong, locking, two piece plastic snap-grommet less than about 200 mils (5 mm) thick mounted in said mounting hole for preventing substrate damage by the fastener and increasing pull strength to the data-tag, whereby the plastic snap-grommet securely locks on the data-tag and is hard to disassemble;

a pencil receptive coating on said polyester substrate for writing thereon whereby pencil markings are shown in a blacker, more durable form; and a sheet of clear material consisting of an ultra-violet blocking plastic overlying and laminated with said receptive coating and adhesively attached thereon and not extending beyond said substrate thereby forming a laminate for protecting the receptive coating and the readability of the instructions thereon.

2. The data-tag of claim 1 in which the polyester substrate is at least 10 mils (0.25 mm) thick.

3. The data-tag of claim 1 in which the plastic grommet comprises a nylon grommet.

4. The data-tag of claim 1 comprising a pencil receptive coating on at least a portion of the substrate for permitting information to be recorded on the tag after manufacture.

5. The data-tag of claim 4 in which the pencil receptive coating comprises a layer of titanium dioxide.

6. The data-tag of claim 4 in which the substrate has a thickness from about 12 to 15 mils (0.3 to 0.375 mm).

7. The data-tag of claim 1 comprising a stress concentrating region for assisting a user to start a tear in the substrate for removing the tag.

8. The data-tag of claim 7 having a generally rectangular shape in which the stress concentrating region comprises a notch in an edge of the substrate.

9. The data-tag of claim 8 in which the notch comprises a V-shaped notch.

10. The data-tag of claim 9 in which the mounting hole is adjacent a first edge of the substrate and the V-shaped notch is adjacent a second edge.

11. The data-tag of claim 10 in which the V-shaped notch is aligned by the mounting hole so that a tear that is started at the notch propagates to the hole.

12. The data-tag of claim 1 in which the sheet of clear material has a matte finish.

13. The data-tag of claim 1 in which the sheet of clear material comprises an adhesive layer and a removable protective sheet covering the adhesive layer.

14. The data-tag of claim 13 having a generally rectangular shape in which the sheet of clear material is attached to the substrate adjacent a first edge of the substrate.

15. The data-tag of claim 13 comprising indicia relating to the use of the tag printed on the removable protective sheet.

16. The data-tag of claim 1 comprising a printed form having luminescent indicia on the polyester substrate.

17. The data-tag of claim 16 in which the luminescent indicia comprise fluorescent pigments on the polyester substrate.

18. The data-tag of claim 16 in which the luminescent indicia comprises phosphorescent pigments on the polyester substrate.

19. The data-tag of claim 1 further comprising a removable form attached to the tag.

20. The data-tag of claim 19 in which the removable form is attached to the substrate by a line of perforations.

21. The data-tag of claim 19 in which the removable form is attached to the substrate along a common edge.

22. The data-tag of claim 19 further comprising a carbon paper or carbonless-type coated paper for replicating information entered on the tag and on the removable form simultaneously.

23. The data-tag of claim 1 in which the substrate and the sheet of clear material have matching rounded corners to reduce the tendency of the sheet of clear material for delaminating from the substrate.

24. The data-tag of claim 1 having a generally rectangular shape comprising a plurality of mounting holes adjacent the edges of the tag.

25. A durable, non-conducting self-laminating data-tag resistant to wet and windy weather conditions and to tampering for securely attaching to a piece of equipment and providing a visible warning comprising:

a tear resistant, polyester substrate from about 10 mils (0.25 mm) to about 15 mils (0.375 mm) thick;

a layer of pencil receptive material comprising titanium dioxide coated on the substrate whereby pencil markings are shown in a blacker, more durable form;

a sheet of dear material consisting of an ultra-violet blocking plastic adhesively attached to the substrate at a first end and free from the substrate at a second end, the second end overlying the layer of pencil receptive material and not extending beyond said substrate;

a layer of adhesive material on the sheet of clear material;

a removable protective sheet covering the adhesive layer on the unattached end of the clear material whereby upon removal of the protective sheet, the sheet of clear material forms a laminate for protecting the receptive coating and the readability of the instructions thereon; and a non-conducting, strong, two piece, plastic snap-grommet less than about 200 mils (5 mm) thick, disposed in a mounting hole extending through the dear sheet and substrate adjacent the first end, reinforcing the hole, preventing substrate damage and providing a means for receiving a fastener; and a notch in an edge of the substrate for initiating a tear.

26. A durable, non-conducting self-laminating data-tag resistant to wet and windy weather conditions and to tampering for securely attaching to a piece of equipment to provide instructions to users comprising:

a tear resistant polyester substrate from about 5 mils (0.125 mm) to about 15 mils (0.375 mm) thick having a mounting hole for receiving a fastener;

a non-conducting, strong, locking, two piece plastic snap-grommet less than about 200 mils (5 mm) thick mounted in said mounting hole for preventing substrate damage by the fastener and increasing pull strength to the data-tag, whereby the plastic snap-grommet securely locks on the data-tag and is hard to disassemble;

a pencil receptive coating on said polyester substrate for writing thereon whereby pencil markings are shown in a blacker, more durable form; and a sheet of clear material comprising a polyvinyl fluoride plastic overlying and laminated with said receptive coating and adhesively attached thereon and not extending beyond said substrate thereby forming a laminate for protecting the receptive coating and the readability of the instructions thereon.

* * * * *